Sept. 6, 1966   C. M. SCHOTT, JR   3,270,606
CUTTING BLADE ASSEMBLY
Filed Feb. 19, 1965
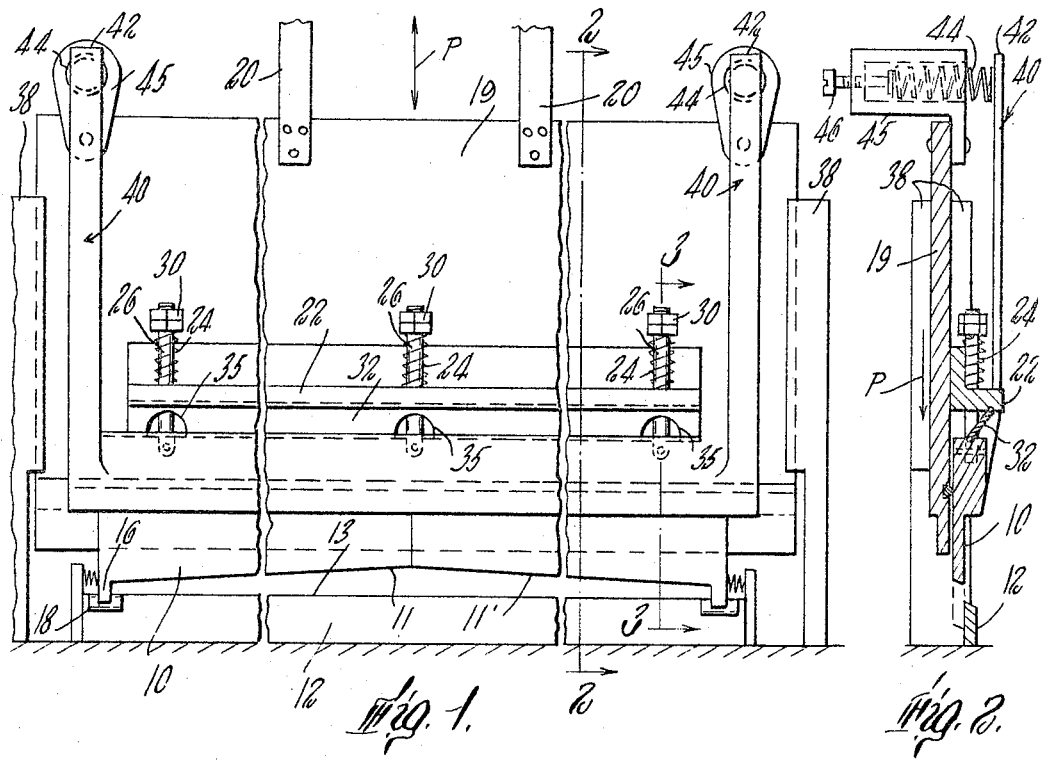
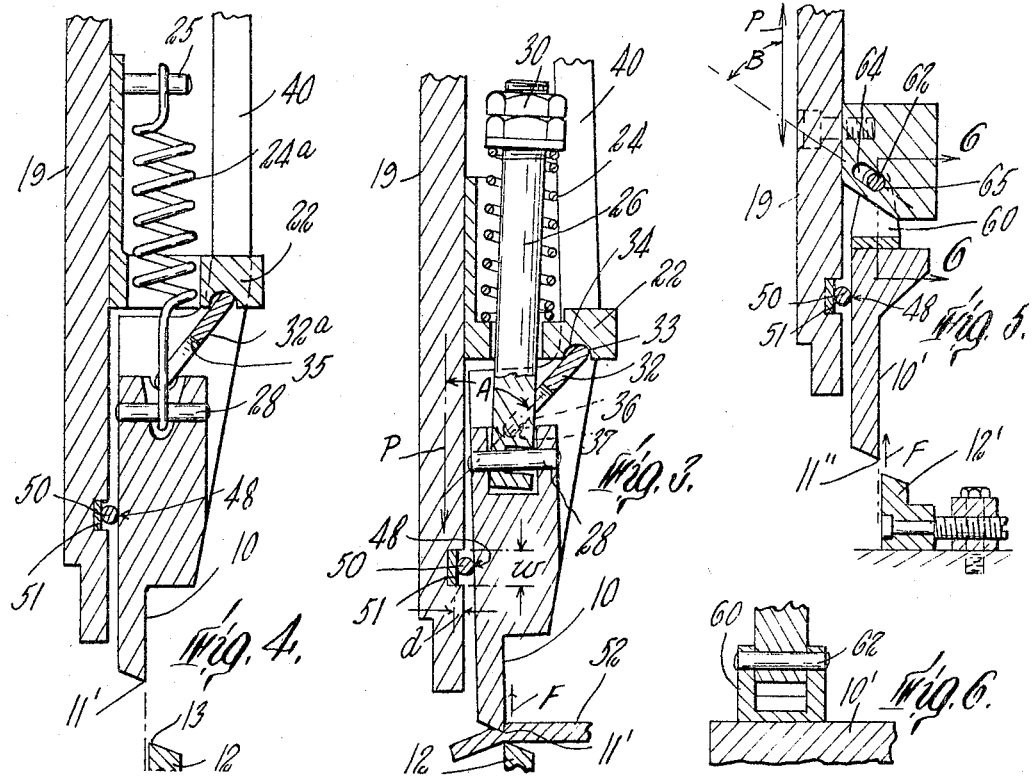

3,270,606
CUTTING BLADE ASSEMBLY
Charles M. Schott, Jr., Gloucester, Mass., assignor to Gloucester Engineering Co., Inc., Gloucester, Mass., a corporation of Massachusetts
Filed Feb. 19, 1965, Ser. No. 433,960
13 Claims. (Cl. 83—579)

This invention relates to shear blades and similar cutting devices.

In perhaps the most common prior arrangement of such blades, the blades are biased transversely together with substantial force at their point of engagement, in order to resist the tendency for the material being cut to spread the blades apart. But, to the sides of the point at which cutting is taking place at any instant and upon return movement of the blade, severe metal-to-metal wear can occur.

A principal object of the present invention is to decrease wear between shear blades and to extend their useful life.

Another object is to produce a blade arrangement in which the force urging the blades laterally together is slight during the non-cutting phases of a cycle of operation.

Another object of the invention is to produce an improved blade arrangement which incorporates only mechanical linkages and is simple to manufacture.

Another object of the invention is to produce a multiple acting shear blade which over a given width requires substantially less blade travel than prior practical arrangements.

Still another object of the invention is to provide a shear blade arrangement capable of extremely high speed operation.

And still another object is to provide a blade arrangement capable of cutting a wide variety of thickness and toughness materials with a single setting, with minimal blade wear and a minimum of blade-to-blade pressure when not cutting.

These and other objects and features will be apparent from the description of the invention that follows, taken in conjunction with the drawings wherein:

FIG. 1 is a side view of a preferred embodiment;
FIG. 2 is a transverse cross-sectional view taken on line 2—2 of FIG. 1;
FIG. 3 is a magnified view of a portion of FIG. 2, depicting the cutting action;
FIGS. 4 and 5 are views similar to FIG. 3 of alternative embodiments; FIG. 6 is a view taken on line 6—6 of FIG. 5.

According to the present invention, at least one of the pairs of blades is provided with means to react under the influence of the cutting action to cause transverse movement or at least additional transverse pressure to be exerted to force the blade edge transversely against the other blade edge sufficiently to maintain cutting action.

By this arrangement it becomes possible, when cutting is not occurring, for the blade to exert only a relatively light transverse force, or no force at all, against the other blade. Hence wear can be reduced, and other structural arrangements and modes of operation, some of which will be described, become possible.

Referring to the embodiment of FIGS. 1–3, there is provided an upper shear blade 10 and a lower shear blade 12. The upper blade has a cutting edge 11 that is sloped across the width of the material to be cut, and the lower blade has a cutting edge 13 that is horizontal. The upper blade has a tang 16 near the lowest part of its edge 11. A guide surface, e.g. block 18 fixed relative to the lower blade, is arranged to engage the tang 16 at least when the cutting edges 11 and 13 are fully separated, so that alignment of the edges is preserved. In this particular embodiment, the lower blade 12 is mounted on a stationary support. The upper blade is mounted on a support plate 19 fixed to arms 20. By mechanism not shown, arms 20 are adapted to reciprocate the supporting structure and blade 10 through cutting cycles. When the blade descends, the point of engagement of the two blade edges 11 and 13 proceeds to the right to progressively cut the material, and when it ascends, the point of disengagement proceeds to the left.

In this embodiment the upper body of blade 10 is mounted to move slightly in a constrained path under the influence of vertical cutting force applied to the blade edge 11 by the material. The path is constrained in such a manner that the blade edge 11 is forced toward lower edge 13. Wherever the cutting force is not applied, or whenever it is relieved, the blade assumes its original condition.

More specifically, with regard to FIGS. 1–3, the blade 10 is supported by bracket 22 by means of compression springs 24 mounted on the opposite side of the bracket and adjustable tension rods 26 pivotally mounted at their lower ends to the blades 10 by means of pins 28, and engaged with the upper ends of the springs by means of adjustable lock nut arrangements 30. The springs are adapted to apply substantial upward force upon the blade 10 to maintain it in position when the entire structure reciprocates at high speed. Thus if the blade weighed 5 pounds, a total upward spring force on the order of 100 pounds would be appropriate.

An elongated deflecting plate 32 extending generally parallel to the blade 10 has its upper edge 33 seated in a rounded slot 34 of the lower surface of bracket 22, and has its lower edge 36 seated in a rounded slot 37, so that, in effect, plate 32 is rotatable relative to both the supporting bracket 22 and the blade 10. The tension rods 26 and springs 24 pull the blade 10 toward support bracket 22, thereby confining the deflecting plate 32 between them, and for this purpose notches 35 are provided in the plate 32 through which the rods 26 pass.

The supporting plate 19 is restricted by guides 38 to the vertical path P, see arrows, so that the blade 10 is carried towards and away from stationary blade 12 by reciprocation of arms 20.

The deflecting plate 32 has its widthwise direction set at a substantial acute angle A to the path P, preferably on the order of 45°. Accordingly, as springs 24 urge the blade 10 toward the support bracket 22, the plate tends to deflect the top of the blade body 10 to the left, applying a counterclockwise moment. To counteract this effect, one or a plurality of moment arms 40 are secured to the blade 10 and extend upwardly a substantial distance. The moment arm ends 42 are associated with compressional springs 44 that are mounted in retainers 45 secured to mounting plate 19 and provided with adjustment means 46 for adjusting the force exerted by the spring 44. Thus a clockwise moment is applied by moment arms 40.

A further element that constrains the blade 10 comprises a fulcrum 48 mounted on a section of the support plate 19 that extends below bracket 22 and located above the edge 11 of blade 10.

Advantageously this fulcrum is a roller means adapted to permit both pivotal movement of the blade 10, and slight vertical movement, but arranged to prevent bodily movement of the blade 10 transversely of stationary blade 12.

A simple rolling means is provided in this embodiment in the form of a rod 50 confined in a slot 51 whose depth $d$ is less than the diameter of the rod and whose width $w$ is substantially greater than the diameter of the rod. This rod extends substantially parallel to the blade, and is confined due to the combined action of the springs 24 and deflecting plate 32.

Referring to FIG. 2, when the support plate 19 is reciprocated along path P in conjunction with stationary guides 38, and when no material to be cut is interposed between the blades, the blade edges engage each other only with such force as is necessary to maintain alignment in the absence of material, see FIG. 2. However, referring to FIG. 3, when material 52 is interposed between the blades, a vertical cutting force F is applied to the edge 11 of he blade 10, as well as forces not shown that tend to move blade 10 to the left. Force F produces an instantaneous unbalanced condition and the springs 24 deflect accordingly. However, deflection plate 32 prevents direct vertical movement of blade 10, hence the upper part of the blade moves to a deflected position to the left, as shown, while deflecting plate 32 rotates slightly. Fulcrum 48 prevents bodily movement of the blade 10 to he left, hence the cutting edge 11 of the blade 10, being located below fulcrum 48, tends to move to the right to exert a substantially increased force toward blade 12.

It will be realized that in order to move to this position the blade 10, through moment arm 40, causes further compression of spring 44, in an amount dependent upon the particular adjustment.

As soon as the material is cut, the cutting force F is relieved, and the spring system returns the blade 10 to its previous non-cutting position. Hence wear is substantially decreased.

It will be appreciated that force F progresses along the blades as cutting proceeds, and that during cutting at one point, depending upon the amount of rigidity of the blade, it is possible to have little or even no increase in force acting between the blades at spaced apart points.

Furthermore, according to the invention, due to decrease of wear and pressure, it becomes practical to use a double sloped blade, in which edges 11 and 11' slope in different directions. Heretofore the wear at the "V" junction and discontinuity prevented the use of such an arrangement at least in many instances. It will be appreciated that such a double sloped blade decreases substantially the stroke length. For instance, with a blade that is 80 inches long, and for a slope of 1/8 inch per foot, the double sloped edge blade can save nearly 1/2 inch in blade travel each way. Hence substantially increased speeds become possible.

The springs and rotating elements enable virtual frictionless movement of the blade, relative to its mounting. If even freer mounting is desired, flexure members can be inserted between the blade pins 28 and rods 26, for instance.

With regard to the clockwise acting counterbalancing spring 44, it is possible for a single spring to be employed, for instance for a single sloped blade having a tang 18 at one end only, a single spring could act upon the opposite end. Advantageously, referring to FIG. 2, when this clockwise counterbalancing moment is provided by an unbalanced force that acts away from plate 19, as is the case with spring 45, a moment arm 40 of substantial length, as shown, is employed, so as to decrease the actual force necessary to achieve a given moment. With the force sufficiently light, the spring 24 and deflecting plate 32 are sufficient to entrap the rod 50 in the slot 51 even under very high speed reciprocating conditions.

It will be appreciated that in some instances it may, however, be possible to apply the counterbalancing moment by a force acting toward plate 19, e.g. by means of a tension spring secured to blade 10 below fulcrum 50, and extending through plate 19. In such instances the spring aids in entrapping rod 50, hence no moment arm would be necessary.

In some instances it is desirable to employ a multiplicity of springs 44 to produce the counterbalancing moment, as shown. Indeed, in some instances it may be desirable to employ such a spring for each spring 24, for instance when a flexible blade is employed, and in such instances the moment arm can be substantially shorter.

One particular advantage of the embodiment of FIGS. 1-3 is its simplicity of manufacture. All of the critical surfaces, namely the edges 33, 36 of the deflecting plate 32, the grooves 34, 37 in which those edges seat and the groove 51 in which the rod 50 seats are straight, elongated formations which are extremely easy to manufacture within satisfactory straightness, uniformity and parallelism, for instance by use of conventional grinding techniques.

These advantages are achievable in other embodiments. For example, referring to FIG. 4, it is possible to employ tension springs 24a mounted at their upper ends to pins 25 (whose height may be adjustable relative to plate 19) for the purpose of drawing the blade 10 toward the deflecting plate 32a.

In another embodiment a plurality of individual strut members having the same cross-section as plate 32 in FIG. 2 can be arranged and seated in the blade and support slots or other rotatable means.

The embodiment of FIG. 5 is different from the foregoing embodiment in that a multiplicity of clevices 60 are mounted to the top of the blade 10', supporting cam follower pins 62 between their arms. These pins 62 are located in constraint slots 64 in a member secured to mounting plate 19, the slot extending at a substantial acute angle B to the path of movement of plate 19. In this particular use of the cam follower pins, no springs are employed to mount blade 10. Instead, blade 10' has a reduced cross-section, relative to the foregoing blades, and is flexible, but resilient. Stationary blade 12' is mounted on an adjustable track, for adjustment toward movable blade 10', and slot 64 is provided with a lower end 65 that serves as a stop. By adjustment of the lower blade 12' to the left, pin 62 engages end 65 of the slot, and further slight movement of blade 12' to the left applies a slight amount of pressure between the blades, sufficient when no material is being cut.

During cutting, force F causes the upper body of blade 10' to move to the left because pin 62 is constrained to move leftward as well as upward by force F, and this causes edges 11'' of blade 10' to exert greater force against blade 12'.

Where, as is often advantageous, and in some instances necessary, friction of the mounting is to be reduced, pins 62 can be freely rotatable. Furthermore, instead of using the resiliency of the blade for biasing purposes, the spring systems of FIG. 3 or 4 can be employed, with the slot 64 modified so that pin 62 never engages the end of the slot. In another embodiment, the fulcrum function can be provided by second slots and cam follower pins, similar to pins 62 and slots 64, except sloped in the other direction, e.g. at 90° to slots 64, and located below slots 64.

Numerous other embodiments incorporating the various teachings herein will occur to those skilled in the art.

What is claimed is:

1. A knife assembly including first and second substantially edge-aligned blades mounted by mounting means on supports to move relative to each other along a first path to cut material lying across said path, said mounting means for said first blade constructed and positioned relative to the edges of said blades so that cutting resistance force in the direction of said path, exerted on the edge of said first blade by the material being cut, will produce a turning moment on said first blade tending to rotate its edge toward the edge of said second blade, said mounting means constructed and arranged to permit rotation of the body of said blade in response to said turning moment to thereby increase the lateral force exerted by the edge of said first blade toward the edge of said second blade in proportion to the cutting resistance encountered by said first blade, said mounting means including positioning means adapted to maintain said blade substantially in a given position under non-cutting conditions.

2. The knife assembly of claim 1 wherein said blade is mounted upon said support in a manner to permit said blade to move relative to said support with at least a slight component in the direction of said path under the influence of said cutting resistance, said mounting means including means arranged to deflect said blade from movement parallel to said path, and to rotate said edge of said blade toward said other blade.

3. The knife assembly of claim 2 including a fulcrum means adapted to prevent bodily movement of said blade transversely away from said other blade, said means to deflect said blade adapted to cause pivotal movement of said blade about said fulcrum means.

4. The knife assembly of claim 3 wherein said fulcrum means comprises a roller means interposed between said blade and an extension of said support.

5. The knife assembly of claim 4 wherein said roller means comprises an elongated straight rod confined in an elongated straight slot having a width greater than the diameter of said rod, and spring means urging said blade toward said extension of said support in the region of said slot.

6. The knife assembly of claim 5 wherein a second spring means is arranged to act upon said blade in the direction tending to release said rod from said confinement, said second spring adapted to act upon said blade through an elongated moment arm, said moment arm being of sufficient length to enable the counterbalancing of a given moment produced by said first spring means without causing translational movement of said blade sufficient to release said rod from said slot.

7. The knife assembly of claim 2 including a first spring means urging said blade toward said deflecting means, and a second spring means arranged to act upon said blade to at least partially counterbalance the deflecting effect of said first spring means to maintain the blade in a predetermined position in the absence of cutting forces.

8. The knife assembly of claim 2 wherein said deflecting means comprises at least one strut member set at a substantial acute angle to the direction of said path, said strut member having a first end rotatably engaged with said blade and a second end rotatably engaged with the support for said blade, and spring means arranged to urge said blade toward said support in the general direction of said path, to position said strut.

9. The knife assembly of claim 8 wherein said deflecting strut comprises an elongated plate extending generally parallel to said blade, the edges of said plate being straight and seated in respective straight, elongated slots formed in said blade and said support.

10. The knife assembly of claim 8 having a second spring means associated with said blade, said second spring means adapted to at least partially counterbalance the deflecting effect of said spring means that retains said strut in position.

11. The knife assembly of claim 10 in conjunction with a fulcrum means located between said blade and said support, said fulcrum means located between, but spaced from, said strut and said cutting edge of said blade, said fulcrum means located on the side of said blade opposite from the side on which said other blade moves.

12. The knife assembly of claim 8 wherein said spring means include compression spring members mounted on the opposite side of said blade support from said blade, and adjustable tension members extending from said blade to the remote ends of said spring members adapted to compress said spring members against said support and thereby urge said blade toward said support.

13. A knife assembly including two substantially edge-aligned blades mounted on supports to move relative to each other along a first path to cut material lying across said path, self-adjustment means for adjusting during cutting at least one of said blades relative to the other blade, one of said blades having an edge, when said blades are spaced apart, that slopes away from said other blade over a first distance, and that slopes back toward said other blade over a second distance, said self-adjustment means adapted to cause cutting resistance force in the direction of said path to controllably increase the force exerted by the edge of said blade transversely of said path toward said other blade.

References Cited by the Examiner

UNITED STATES PATENTS 890,300  6/1908  Reinhold _____ 83—582

FOREIGN PATENTS 501,583  11/1954  Italy.

WILLIAM W. DYER, JR., *Primary Examiner.*

L. TAYLOR, *Assistant Examiner.*